United States Patent
Derenthal et al.

(10) Patent No.: US 6,840,369 B2
(45) Date of Patent: Jan. 11, 2005

(54) INFEED SYSTEM FOR A STACKING APPARATUS

(75) Inventors: Jerome W. Derenthal, Lebanon, NJ (US); Robert O. Wolfelsperger, Fairfield, NJ (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 10/367,321

(22) Filed: Feb. 14, 2003

(65) Prior Publication Data

US 2003/0123968 A1 Jul. 3, 2003

Related U.S. Application Data

(62) Division of application No. 09/610,248, filed on Jul. 5, 2000, now Pat. No. 6,543,989.
(60) Provisional application No. 60/142,450, filed on Jul. 6, 1999.

(51) Int. Cl.$^7$ ................................................ B65G 47/26
(52) U.S. Cl. ...................... 198/426; 198/418.6; 198/431
(58) Field of Search ............................. 198/426, 418.6, 198/431, 433, 427, 459.1, 459.8, 460.1, 460.3, 461.1, 461.2, 462.1, 462.2, 575, 576, 577, 579; 414/790, 790.1, 790.3

(56) References Cited

U.S. PATENT DOCUMENTS

| | | | |
|---|---|---|---|
| 2,770,392 A | 11/1956 | Roberts | |
| 2,872,020 A | 2/1959 | Hansel et al. | |
| 3,590,972 A | 7/1971 | Mosterd | |
| 3,870,139 A | 3/1975 | Wagner | |
| 3,964,598 A | 6/1976 | Alsop | |
| 4,013,179 A | 3/1977 | Fluck | |
| 4,016,969 A | * 4/1977 | Brand | 198/435 |
| 4,018,326 A | 4/1977 | Hardy | |
| 4,075,359 A | 2/1978 | Thulin | |
| 4,076,114 A | 2/1978 | Tokuno | |
| 4,135,616 A | 1/1979 | Pellaton | |
| 4,141,442 A | 2/1979 | Cole et al. | |
| 4,155,441 A | 5/1979 | Albrecht et al. | |
| 4,162,870 A | 7/1979 | Storm | |
| 4,166,525 A | * 9/1979 | Bruno | 198/437 |
| 4,194,300 A | 3/1980 | Swanson et al. | |
| 4,209,960 A | 7/1980 | Deutschlander et al. | |

(List continued on next page.)

Primary Examiner—Eileen D. Lillis
Assistant Examiner—Rashmi Sharma
(74) Attorney, Agent, or Firm—Hollander Law Firm, P.L.C.

(57) ABSTRACT

Groups of individual shingled items such as graham crackers or cookies are stacked in vertical stacks of predetermined heights and/or number of items using a stacking apparatus having at least one set of lowering arms. A stacking conveyor belt continuously delivers groups of shingled items to the end of the conveyor where the items come into contact with the lowering arms. The lowering arms then gently lower shingled items to a lower stacking level while forming a vertical stack. The items in the stack remain in substantially horizontal position while being lowered from the stacking conveyor to the lower stacking level. The apparatus is substantially jam-free and is highly tolerant to irregular placement of the shingled items on the stacking conveyor. The stacking apparatus can be used for stacking of groups of shingled items of different size and/or weight with little or no modification. The stacking apparatus may include an infeed system for delivering groups of shingled items to the stacking conveyor at regular intervals. The infeed system is capable of receiving items in the same direction or at a right angle to the flow of the infeed system. Items delivered at a right angle to the flow of the infeed system are received by a tilt conveyor adopted to gently receive breakable and fragile items with virtually no impact or damage to the items.

17 Claims, 7 Drawing Sheets

U.S. PATENT DOCUMENTS

| | | | |
|---|---|---|---|
| 4,214,743 A | | 7/1980 | Meier |
| 4,238,024 A | | 12/1980 | Hirakawa et al. |
| 4,266,654 A | | 5/1981 | Achelpohl et al. |
| 4,281,756 A | * | 8/1981 | Bruno .................... 198/369.2 |
| 4,282,964 A | | 8/1981 | Hogenkamp et al. |
| 4,421,019 A | | 12/1983 | Hocking et al. |
| 4,432,685 A | | 2/1984 | Stauber |
| 4,457,665 A | | 7/1984 | Fluck |
| 4,469,219 A | | 9/1984 | Cosse |
| 4,541,763 A | | 9/1985 | Chandhoke et al. |
| 4,544,315 A | | 10/1985 | Muskulus |
| 4,547,112 A | | 10/1985 | Steinhart |
| 4,565,363 A | | 1/1986 | Faltin |
| 4,585,227 A | | 4/1986 | Muller |
| 4,678,418 A | | 7/1987 | Thulin |
| 4,684,008 A | | 8/1987 | Hayashi et al. |
| 4,712,356 A | | 12/1987 | Hardage et al. |
| 4,736,570 A | | 4/1988 | Hardage et al. |
| 4,746,004 A | | 5/1988 | Hess et al. |
| 4,827,698 A | | 5/1989 | Banks |
| 4,880,350 A | | 11/1989 | Stobb |
| 4,960,198 A | | 10/1990 | Hogenkamp |
| 4,977,827 A | | 12/1990 | Chandhoke et al. |
| 5,010,715 A | | 4/1991 | Fluck |
| 5,014,974 A | | 5/1991 | Jones et al. |
| 5,020,305 A | | 6/1991 | Treiber |
| 5,035,315 A | | 7/1991 | Fukusaki et al. |
| 5,069,019 A | | 12/1991 | Lodewegen |
| 5,078,255 A | | 1/1992 | Haley |
| 5,095,684 A | | 3/1992 | Walker et al. |
| 5,287,952 A | | 2/1994 | Redaelli |
| 5,308,223 A | | 5/1994 | Sternheimer et al. |
| 5,429,223 A | * | 7/1995 | Moeller .................... 198/369.1 |
| 5,439,096 A | | 8/1995 | Shigematsu et al. |
| 5,460,843 A | | 10/1995 | Greene |
| 5,640,833 A | | 6/1997 | Gerber |
| 5,761,883 A | | 6/1998 | Pruett et al. |
| 5,823,738 A | | 10/1998 | Spatafora et al. |
| 5,829,954 A | | 11/1998 | Pruett |
| 5,893,701 A | | 4/1999 | Pruett |
| 5,957,050 A | | 9/1999 | Scheffer et al. |
| 6,099,452 A | | 8/2000 | Hoza et al. |
| 6,131,372 A | | 10/2000 | Pruett |
| 6,146,084 A | | 11/2000 | Doyle |
| 6,189,678 B1 | | 2/2001 | Loewenthal et al. |
| 6,338,482 B1 | | 1/2002 | Geske et al. |
| 6,397,563 B1 | | 6/2002 | Hammacher |
| 6,409,462 B2 | | 6/2002 | Newsome et al. |
| 6,438,925 B1 | | 8/2002 | Straub |
| 6,640,523 B2 | | 11/2003 | Jones, Jr. et al. |
| 2003/0196871 A1 | | 10/2003 | Jones, Jr. |
| 2004/0022618 A1 | | 2/2004 | Jones, Jr. et al. |

* cited by examiner

INFEED SYSTEM FOR A STACKING APPARATUS

This application is a divisional application of U.S. Ser. No. 09/610,248, filed Jul. 5, 2000, now U.S. Pat. No. 6,543,989, which is a utility application of provisional application U.S. Ser. No. 60/142,450, filed Jul. 6, 1999.

FIELD OF THE INVENTION

The invention relates to a method and a stacking apparatus for stacking various shingled items such as crackers or cookies moving on a conveyor belt into vertical stacks of predetermined heights or number of items. The invention further relates to infeed systems for delivering of groups of shingled items to stacking apparatus that comprises a receiving tilt conveyor.

BACKGROUND OF THE INVENTION

In the large scale production of wrapped or unwrapped products, such as food items, tiles, compact disks (CDS) or other relatively flat products or packages it is often desirable to arrange groups of individual items into vertical stacks for further wrapping or packaging the vertical stacks of the items into larger trays or containers.

Vertical stacks comprising loose individual items such as crackers, cookies, tiles or small packages or bags stacked upon each other can be produced manually or by using various stacking methods and apparatus. Sometimes, it is advantageous to arrange individual items in a shingled manner prior to stacking of individual items into vertical stacks for easier formation of vertical stacks, or for other considerations in their manufacture. Shingled items are usually delivered to a stacking apparatus in groups or in a continuous stream on a conveyor. Shingling of loose items may be achieved by using several conveyors arranged in series and moving at various speeds which are continuously fed with a stream of loose items. The loose items are delivered to the series of conveyors which place the items in a shingled arrangement from another location. The items are usually delivered to the first conveyor in the series of shingling conveyors by another conveyor moving in the same direction or transverse direction to the flow of the series of shingling conveyors.

Apparatus for stacking shingled items is disclosed, for example, in U.S. Pat. No. 2,708,863 to Payne. Shingled items are delivered via a conveyor into a vertical stack with the aid of movable stop fingers that rise up to prevent forward movement of items, thus causing shingled items to pile on top of each other forming a vertical stack. After a vertical pile is formed, the fingers lower to allow continuous forward movement of the vertical stack.

U.S. Pat. No. 3,088,604 to Nilsson discloses stacking shingled items (newspapers) into vertical stacks on a support platform and transporting the stacks on the support platform to another conveyor.

U.S. Pat. No. 3,124,059 to Labombarde discloses stacking of shingled items into vertical stacks. Shingled items delivered by a conveyor fall down a chute. The items are guided by rollers to fall flat without tilting.

U.S. Pat. No. 3,195,739 to Hein et al., discloses a piling device that moves and stacks items from an upper platform to a lower table by using swinging arms that pick up the items at the end of an upper platform and slide them to a lower level.

U.S. Pat. No. 3,331,516 to Gubeli discloses a method and apparatus for stacking of shingled items delivered by a conveyor, into vertical piles (stacks) wherein shingled items fall down the chute at the end of the conveyor. Their movement is guided by a pressure rail at the end of the conveyor.

U.S. Pat. No. 3,403,033 to Griner discloses shingling of flat biscuits wherein pieces arrive in a flat position and are separated from each other, stacked in tilted overlapping position and then in non-overlapping completely vertical edge position for packing.

U.S. Pat. No. 3,429,416 to Provost et al, discloses a transfer conveyor apparatus for delivering rows of articles to several infeed conveyors moving at a right angle to the transfer conveyor.

U.S. Pat. No. 3,488,917 to Oswald et al. discloses transportation and packing of shingled book matches. A wiper blade prevents shingled products from falling down when a carriage intermittently moves backwards.

U.S. Pat. No. 3,638,538 to Sullivan discloses stacking of shingled items into vertical piles. After a predetermined number of items has been counted, a vertical stopper arm is moved upward and forward to move the items toward the closed door stacking them into a vertical position. The arms drop down sharply when they reach the end point and the items are in a complete vertically stacked position. The door is then open to allow the stacked items to be moved to another transporter. The arms move shingled items to a stopper door, densifying the stack along the way and eventually stacking items in completely vertical stacks.

U.S. Pat. No. 3,874,522 to Rana discloses converting of a loose shingle stack of signatures (any flat products) into a dense stack of shingled signatures.

U.S. Pat. No. 4,282,964 to Hogenkamp et al, discloses a device for transferring articles arriving in transverse rows on an upper conveyor to a lower removal belt. The device comprises a transfer belt pivotally mounted for alignment with the plane of the delivery belt and the plane of the removal belt.

U.S. Pat. No. 4,432,685 to Stauber discloses an overhead stop plate. In a prestacker that stacks products arriving as shingled piles via conveyor to the prestacker, the product falls down a chute forming vertical stacks. However, before falling, each single piece of product hits a stop plate that stops the piece from moving forward and guides it to fall down the chute.

U.S. Pat. No. 5,095,684 to Walker et al. discloses an apparatus for conveying individual, flat laying products (such as cookies) from a horizontal position to shingled overlapping stacks and to a completely vertical edge position using several conveyors moving at different speeds. The speed is varied depending on the heights of the cookies. The cookies are counted, and a predetermined number of cookies, in completely vertical position are then packaged in cookie trays. Stacking shingled products in a horizontal position in vertical stacks (on top of each other) is not disclosed.

U.S. Pat. No. 5,287,952 to Radaelli discloses a device for transferring of rows of items from an upper conveyor belt to a lower conveyor belt arranged at a right angle. The device comprises two intermediate shelves. The first shelf is pivotally mounted to align with the end of the downward inclined upper conveyor to receive rows of items by inclining upwards. Then, it is aligned in a horizontal position with the second shelf to transfer the rows of items to the horizontal second shelf. The second shelf then moves downward for alignment with the edge of the lower conveyor and to transfer rows of items to the lower conveyor.

U.S. Pat. No. 5,460,843 to Greene discloses a device for packaging cookies. Prior to packaging, the cookies are dropped to a lower level conveyor with the help of an overhead belt system that orients cookies into a vertical position. The last cookie of each stack with a predetermined number of cookies is inverted. The cookies are then stacked in vertical position in stacks and packaged with the last cookie being inverted and facing an opposite direction compared to the rest of the stack.

U.S. Pat. No. 5,640,833 to Gerber discloses a device for transferring items from a supply belt on a transverse belt. The device comprises an intermediate supply conveyor belt with a tilting end for alignment with the surface of the transverse belt for gentle discharging items onto the transverse belt.

None of the stacking apparatus for forming vertical stacks from groups of shingled individual items disclosed in the cited references teach or suggest apparatus comprising lowering arms, or beams, that gently transport items to be stacked to a lower stacking level, wherein the items remain in a substantially horizontal position while being lowered by the lowering arms, and the bottom item of the forming stack remains on the lowering arms in substantially horizontal position during the entire time it remains in contact with the lowering arms. Also the references do not disclose an infeed system comprising a series of conveyors for shingling and separating a stream of items into groups of predetermined number which employs a tilting conveyor for gentle receiving of groups of items.

The present invention provides a method for producing vertical stacks and a stacking apparatus comprising at least one set of lowering arms or beams that lower items continuously delivered by an infeed conveyor system in shingled groups, to a lower stacking level, while forming vertical stacks. The items remain in an at least substantially horizontal position all or substantially all the time during the stacking cycle. The infeed system, comprising a series of conveyors moving at various speeds, is capable of gently: a) receiving items delivered to the infeed system in the same direction, or at a right angle to the direction of the flow of the infeed system, b) breaking the stream of items into groups of predetermined number, c) shingling the items in the groups, and d) delivering groups of shingled items to the stacking apparatus at regular intervals synchronized with the stacking cycle of the lowering arms. The apparatus allows for efficient and easy handling of large numbers of items per minute. It can be used with little or no adjustment to handle items of different shape, can be easily adjusted to handle groups of items containing different numbers of items per group, and is virtually jam-free. It is also very gentle on the items being stacked. The apparatus is highly tolerant to misoriented or irregularly placed items, irregularly shaped or broken items, and is capable of curing most of the misorientations and other irregularities during the stacking process to form regularly shaped stacks.

SUMMARY OF THE INVENTION

The invention provides a method and apparatus for stacking groups of shingled items, such as food items, into vertical stacks. The stacking apparatus includes at least one set of lowering arms capable of transporting groups of items from a delivery conveyor system or a conveyor belt to a lower stacking position while forming the groups of items into vertical stacks. The bottom or leading item of each group of shingled items remains in contact with the lowering arms while the forming stack is being transported from the conveyor belt to the lower stacking position. Also, each item in the group remains in substantially horizontal position during the stacking process. Vertical stacks of a predetermined height are formed from groups containing a predetermined number of individual items that have been placed in a shingled arrangement by an infeed system. The infeed system delivers the group of items in a shingled arrangement to the input end of the stacking apparatus. The infeed system includes a series of successive conveyors that operate at variable speeds to arrange the items in shingled groups of predetermined number The infeed system also provides wide space gaps between the groups to allow the stacker to complete one stacking cycle immediately before the next group of items reaches the stacking or output end. The infeed system may further include a receiving conveyor to receive items delivered at a right angle to the flow of the infeed system. The receiving conveyor may be a tilt conveyor which is specifically adopted for receiving fragile or breakable items while minimizing impact and damage to the items.

DETAILED DESCRIPTION OF THE INVENTION

Figure 1A:
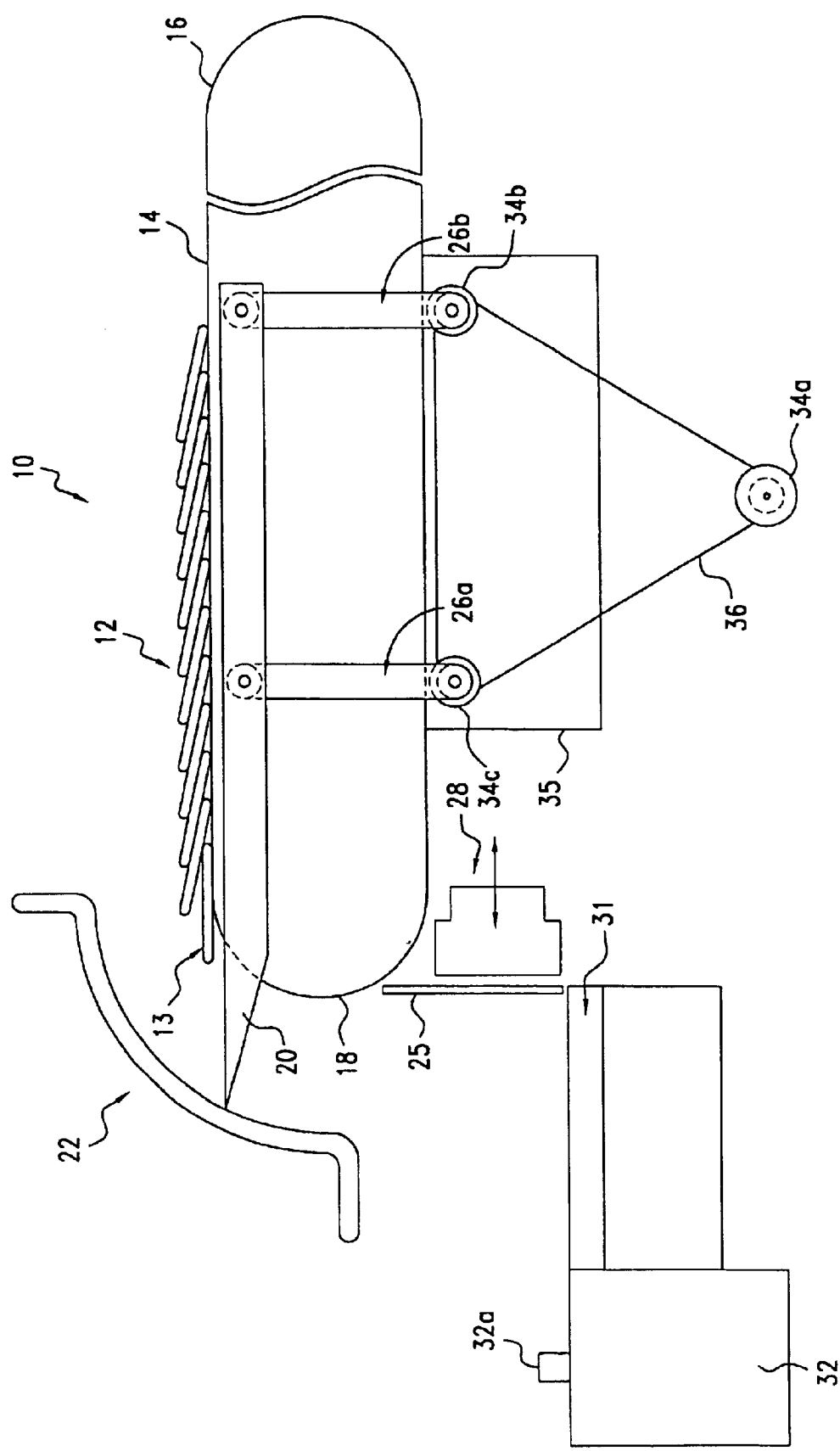
FIG. 1a shows a schematic side view of a stacking apparatus for stacking groups of individual shingled food items, such as graham crackers, with the lowering arms in an upper position.

The present invention provides a lowering arm stacking apparatus for stacking various individual items into vertical stacks of predetermined heights. Stacking apparatus allows for transfer of goods, continuously delivered by a conveyor system in groups having a shingled arrangement, from the conveyor system to a lower stacking position while maintaining the goods in an at least substantially horizontal position. It minimizes impact of placing or dropping of one item on top of another item to form a stack. The groups of items are discharged from the lowering arms to the lower stacking level without sliding or rolling off the lowering arms which minimizes abrasive damage or breakage to the stacked items. The stacking apparatus requires no or little modification or adjustment to handle items of various size and weight, loose individual items or packaged items. The apparatus of the invention may be employed for stacking, for example, food items that range from small individual crackers, such as graham crackers or cookies to boxes of frozen vegetables, packaged goods. Non-food items such as CD's or even vinyl flooring tiles or ceramic tiles, may also be stacked providing that the items enter the stacking end of the apparatus in groups of shingled arrangement.

The apparatus of the present invention comprises an upper conveyor system, such as a stacking conveyor belt having two ends: 1) an item input end, i.e., the end where the groups of shingled items are loaded on the belt, and 2) an item delivery end, i.e., the end where the transported items are disposed or transferred from the conveyor and collected in vertical stacks. The stacking conveyor belt continuously delivers the items that require stacking to the delivery end where the items come into contact with the lowering arms, or beams. The lowering arms transfer the stackable items from the stacking conveyor belt to the lower stacking position where the items are collected in vertical stacks. The lower stacking position may be a stationary lower platform with a pusher plate to push stacks onto another conveyor. In another embodiment, the lower stacking position may be a conveyor belt that transports the formed vertical stacks of items to another location for further processing such as wrapping or packaging of stacks in bigger containers. The lower conveyor belt may travel in a direction substantially parallel to the flow direction of the stacking conveyor belt or normal to it, i.e. at a right angle to it. The lower conveyor may be a simple conveyor belt or may comprise various compartments, flap fingers or other devises to assist transportation of the formed vertical stacks without toppling of the stacks. The lower conveyor belt may operate continuously or intermittently in a manner so as to not topple the stack.

The stacking apparatus may include at least one set of lowering arms, wherein each set comprises two lowering arms. The lowering arms have a flat upper surface and are located adjacent to the upper conveyor belt, one on each side of the conveyor. The arms move in continuous forward, downward, rearward and upward circular paths during one stacking cycle. Movement of both lowering arms within the set are completely synchronized to exactly duplicate each others movement. Synchronization of the lowering arms within the set may be achieved using a mechanical connection between the beams or electronically. In embodiments using a mechanical synchronization, the synchronization of the movements of the lowering arms is achieved by driving the lowering arms or beams with a common motor.

During one stacking cycle, the lowering arms move 360° or one complete full circular path. The lowering arms move forward and come into contact with the leading or the bottom item of a group of items during horizontal movement of the group at the item delivery end of the stacking conveyor. The arms remain in contact with the bottom item during lowering of all the items in the group to the lower stacking level. The lowering arms lower the items while moving downward. As the lowering arms move downward and lower items already stacked on the arms, the trailing items sequentially slide into a stacked position on top of the preceding item. After the complete stack of items is lowered to the stacking level, the lowering arms retract backward in a circular path and release items stacked on the lower level. After the items are thusly stripped off the lowering arms, the lowering arms return to their upper position for receiving the next group of items, thus completing a stacking cycle. The lowering arms then move forward to come into contact with the next item or group of items to be stacked into a vertical stack.

The lowering arms may move with a different speed during the part of the cycle when the arms are in contact with the product and during the part of the cycle when the arms return to the upper position after releasing a stack of items on the lower level. The speed of the lowering arms during the return part of the stacking cycle is adjusted to maximize the productivity and stacking efficiency of the apparatus. During the stacking cycle the items remain in at least substantially horizontal position at least substantially all the time so that slippage or sliding of the items from the lowering arms does not occur and the items are gently loaded onto the lower level platform. The stack is discharged from the lowering arms when the lowering arms retract from the stack loaded onto the lower platform by moving backward and downward so that the lower item does not slide or roll off the arms.

In addition to the stacking conveyor belt, the lower stacking platform or conveyor, and at least one set of lowering arms or beams, the stacking apparatus for stacking of shingled items, such as graham crackers preferably includes: 1) a guide means or a guide located at least partially above the stacking conveyor, and 2) a lower stop plate for preventing stacks of crackers from moving backwards.

Groups of shingled crackers comprising a predetermined number of crackers are continuously transported via the stacking conveyor belt to the delivery or exit end of the stacking conveyor. Upon reaching the delivery end, the leading or the bottom item, which may be a cracker, comes into contact with at least one set of lowering arms. The arms continuously lower the first cracker while the other crackers, one by one, reach the delivery end and each cracker piles upon the previous cracker thus forming a vertical stack. The guide, located at least partially above the delivery end of the stacking conveyor, prevents crackers from moving forward while being placed on top of each other and lowered to the lower level. The guide can be of various shapes, but to minimize the impact of the crackers against the guide and to achieve a sliding effect on the crackers, it is preferred that the guide comprises a curved surface with the radius of the curve being similar or greater to the radius of the curve of the stacking conveyor at the delivery end of the conveyor. The guide should be located above and away from the delivery end of the upper conveyor so that the guide: 1) helps to stop the horizontal movement of the cracker, 2) helps to guide the crackers into vertical stacks, and 3) allows the forming, vertical stacks of crackers to be freely lowered by the lowering arms to the lower stacking level platform. Upon reaching the lower level platform or conveyor, the lowering arms release the vertical stack of crackers and retract backward. The lower stop plate prevents any backward movement of the stack during lowering and discharging of the stack onto a lower stacking platform. The crackers remain in substantially horizontal position during the entire stacking cycle, i.e., from the moment the first crackers come into contact with the lowering arms to the moment the complete stack is placed onto the lower stacking level and the lowering arms retract from the formed stack. The lowering arms then move upward and forward to repeat the stacking cycle with another group of shingled crackers.

The stacking apparatus may further include a pusher plate that pushes each formed stack away from the stacking conveyor and the lower stacking level, and places the stack onto another conveyor that transports the stacks to another location for further wrapping or packaging in suitable packages.

The position of the lowering arms is timed and adjusted so that the lowering arms reach their uppermost position and align or substantially align with the upper surface of the upper conveyor every time the first cracker of a shingled group is delivered to the delivery end of the upper conveyor. While in the uppermost position, the lowering arms are positioned just slightly below the surface of the upper conveyor. In this position, the lowering arms should extend beyond the delivery end of the conveyor by a length equal to or greater than the size of the individual item to be stacked, so that the first item fits across the extended portion of the lowering arms. The lowering arms extend beyond the delivery end of the upper conveyor during the entire time the lowering arms remain in contact with the stacked items. However the lowering arms should not extend too far beyond the upper conveyor so that the lowering arms do not intersect the path and interfere with the conveyor that transports the stacked items to another location for packaging. The precise timing of the position of the lowering arms relative to the shingled items on the stacker conveyor belt can be achieved by methods known in the art such as by the use of vision detectors, video cameras, light detectors or photoelectric eyes for detecting gaps between the shingled groups of crackers.

The stacking conveyor may be fed manually or preferably automatically, with the groups of shingled items by an infeed or loading system. The infeed system may be any system that feeds groups of shingled items to the input end of the stacking conveyor at regular intervals or regularly spaced from each other. The feeding may be continually or intermittently. In preferred embodiments, the infeed system may include a series of successive conveyors that count the items, separate them into groups, and shingle them and separate the shingled groups so that the groups arrive at the stacking apparatus at regular intervals synchronized with one stacking cycle of the lowering arms.

The infeed system may include from 3, preferably 4 to 12 or more conveyors depending on the way the items arrive at the first conveyor, the speed of the overall operation and other factors, such as the size of the items. The items may arrive in flat, shingled or horizontal stack arrangements. If they arrive in any other arrangement than flat, the items are first placed into flat arrangement. The items may also arrive at the infeed system in the flow direction of the infeed system or at a right angle to the flow direction of the infeed system. If the items arrive at a right angle, the infeed system comprises an additional conveyor located at the beginning of the series of conveyors in the infeed system. This additional, first in the series, or receiving conveyor is necessary for accepting groups or strips of items delivered at a right angle to the infeed system flow. The receiving conveyor transports the groups of items to the next conveyor of the infeed system in the direction of the infeed system flow.

Methods for delivering of items at a right angle to the infeed system flow by right angle strip conveyors are known in the art and are customarily used in the transportation of candy bars. Batches or strips of products may be delivered to the receiving conveyor located at the beginning of the series of infeed conveyors by a drop gate conveyor. The technology of delivering batches or strips of items at a right angle to an infeed system by drop gate conveyors is known and commonly referred to as "candy bar" delivery technology. During such a delivery of candy bars or other batches or strips of items, the items are delivered to the receiving conveyor at a right angle to the flow of the infeed system via an overhead conveyor comprising drop gates located above the receiving conveyor of the infeed system. When a strip of items reaches the drop gate, the gate opens by tilting downward to the level just above the level of the receiving conveyor of the infeed system, allowing the group of items to slide to the first conveyor. The overhead conveyor usually feeds several infeed systems or legs located parallel to each other. As soon as one strip is delivered to one of the receiving conveyors of one of the infeed systems, the drop gate closes, or moves back to a horizontal position, and the next strip of items flows to the next drop gate. While this known "candy bar" technology may be employed in the present invention, it is preferred that a tilt conveyor in accordance with the present invention be used as the first or receiving conveyor for accepting items delivered at a right angle. The tilting receiving conveyor is particularly preferred when the product items are fragile or breakable items.

The tilting receiving conveyor of the present invention provides a way to receive items delivered at a right angle to the receiving conveyor in a gentle manner avoiding hard impacts or dropping of the items. This is especially important, for example, for loading breakable baked items such as cookies, chips or graham crackers that can easily crack or break if subjected to minimal impact forces. The tilt conveyor may be pivotally mounted for rotation about the line that centrally divides the width of the upper surface of the receiving tilt conveyor. The tilt conveyor may tilt at the same or substantially the same angle as the drop gate while receiving strips of items delivered by the right angle overhead conveyor. By tilting at the same or about the same angle as the drop gate, the surface of the tilt conveyor becomes at least substantially aligned with the surface of the opened drop gate. Accordingly, the items delivered by the overhead conveyor gently slide onto the surface of the receiving tilt conveyor that is aligned with the surface of the drop gate. This minimizes any impact that may occur by sliding items from the tilted drop gate onto horizontally positioned receiving conveyors used in the previously mentioned "candy bar" technology.

The tilt conveyor of the present invention further comprises a backstop that prevents items from moving forward past the receiving tilt conveyor surface and sliding off the receiving conveyor while the conveyor remains in its tilted position receiving the delivered groups of items. The backstop may be located adjacent to the tilt conveyor or may be attached to the receiving tilt conveyor. If the backstop is attached to the conveyor, the backstop tilts together with the conveyor. If the backstop is not attached to the tilt conveyor and is located adjacent to it, the backstop is usually located below the horizontal position level of the tilt conveyor so that it becomes at least substantially aligned with the edge of the tilt conveyor in its tilted position. In the preferred embodiment, the backstop is not attached to the tilt conveyor and is located adjacent to the tilt conveyor.

The position of the backstop is adjusted so that when the sliding items reach the backstop, the items are positioned substantially in the middle of the receiving conveyor. Thus, the center of gravity of each of the items loaded onto the tilted receiving conveyor is located substantially directly above the line centrally dividing the width of the receiving conveyor, and at the rotation line of the tilt conveyor. The position of the items on the tilted conveyor is important so that the items do not slide, tilt or move upon the rotation of the tilt conveyor back to its original horizontal position.

In preferred embodiments, the width of the tilt conveyor is slightly narrower than the length of individual items received by the tilt conveyor. This allows the items stopped by the backstop to be easily positioned in the middle of the conveyor belt as described above. As soon as the items are loaded onto the tilt conveyor and the tilt conveyor rotates back to its original horizontal position, the tilt conveyor accelerates forward very quickly to rapidly deliver a loaded strip of items to the next conveyor in the series of infeed system conveyors. The tilt conveyor has to move forward very quickly to clear the way for the next strip of items delivered by the right angle overhead conveyor.

The profile of the conveyor belt of the receiving tilt conveyor can be flat or of any conventionally known shape. However, conveyor belts having regularly spaced rounded lugs or teeth are preferred. The teeth are regularly spaced from each other with the distance between the centers or the tops of the teeth being substantially equal to the width of an individual item from the strip of items received by the tilt conveyor. The radius or height of each tooth should be slightly greater than the height or thickness of the individual items.

The movement of the tilt conveyor and the overhead delivery conveyor are synchronized so that each individual item from the strip of items delivered by the overhead conveyor is loaded between the teeth of the tilt conveyor belt. Upon discharging the strip of items onto the tilt conveyor each of the individual items occupies space between the teeth so that the front edge of each item is leaning on one of the teeth and the back edge of each item is resting against or near the bottom of the next tooth. The teeth have primarily two purposes. First, the teeth allow for rapid acceleration of the tilt conveyor. Supporting the back edge of each item at the bottom of the following tooth prevents items, especially the last few items in a strip, from sliding backwards upon rapid forward acceleration of the tilt conveyor. Second, the lugs help to align misoriented items to facilitate handling of the items and uniform discharging to the following conveyors.

The tilt conveyor delivers batches or strips of items to the next conveyor and discharges the items to the next conveyor in a flat arrangement. Flatly arranged items are than arranged into a solid stream of items by two or more gap closing belts or conveyors that completely or substantially eliminate gaps between the strips of items. The gap closing belts operate at the same velocity as the tilt conveyor when they receive the strip of items and then decelerate to a slower speed while discharging the strips to the following conveyor belt. The first gap closing belt may even operate at slightly higher speed than the tilt conveyor while accepting items from the tilt conveyor. By moving with a slightly higher speed the first gap closing conveyor removes items quickly so that the lugs do not touch the trailing end of the items loaded onto the first gap closing conveyor. This is particularly important when the delivered items are fragile or easy to brake.

The gap closing belt may include gap closing shuttles that eliminate any gaps in the stream of items due to missing items. A solid stream of items is then broken or separated into groups of predetermined number by extending a retractable noser and momentarily increasing the speed of a downstream conveyor belt. The predetermined amount of items may be counted by a counting means or strip length measuring means, such as an overhead counter, a photoelectric eye, a vision system or any other known counting or length measuring means. When the trailing piece for a group is determined by the counting means or other measuring means to be on the downstream conveyor, the retractable noser extends while the downstream conveyor momentarily increases in speed, thus separating groups of items.

The separated groups are then shingled by placing them on a slower moving conveyor, and the gap between the groups is increased by two or more successive gap separating conveyors. Then, regularly separated groups are feed to the item input end of the stacking conveyor. The gaps or intervals between the groups are chosen to synchronize the arrival of the first item in each shingled group to the delivery end of the stacking conveyor at the time when the lowering arms are in their upper position and ready to receive the group and begin the stacking cycle. Alternatively, the lowering arms may be stopped and held in the upper position at the end of one stacking cycle waiting for the arrival of a new group of items.

The stacking apparatus can be easily adjusted to form stacks of various heights, it tolerates irregularities in a shingled arrangement, i.e., it is not sensitive to irregularly placed or crooked crackers, or even small gaps between crackers within the same group that forms a single vertical stack, and it is also insensitive to broken crackers within the shingled group of crackers. Regular stacks will be formed from a shingled arrangement containing minor irregularities as discussed above, and these irregularities will be cured during the stacking cycle producing regular vertical stacks. Moreover, where a shingled group contains too many broken individual items such as broken crackers, or a gap between crackers is too large to form a regular stack, the stacking apparatus of the invention may, occasionally, produce, in such a case, an irregular stack. However, it does not get jammed and will not require interruption of the stacking process.

Figure 2:
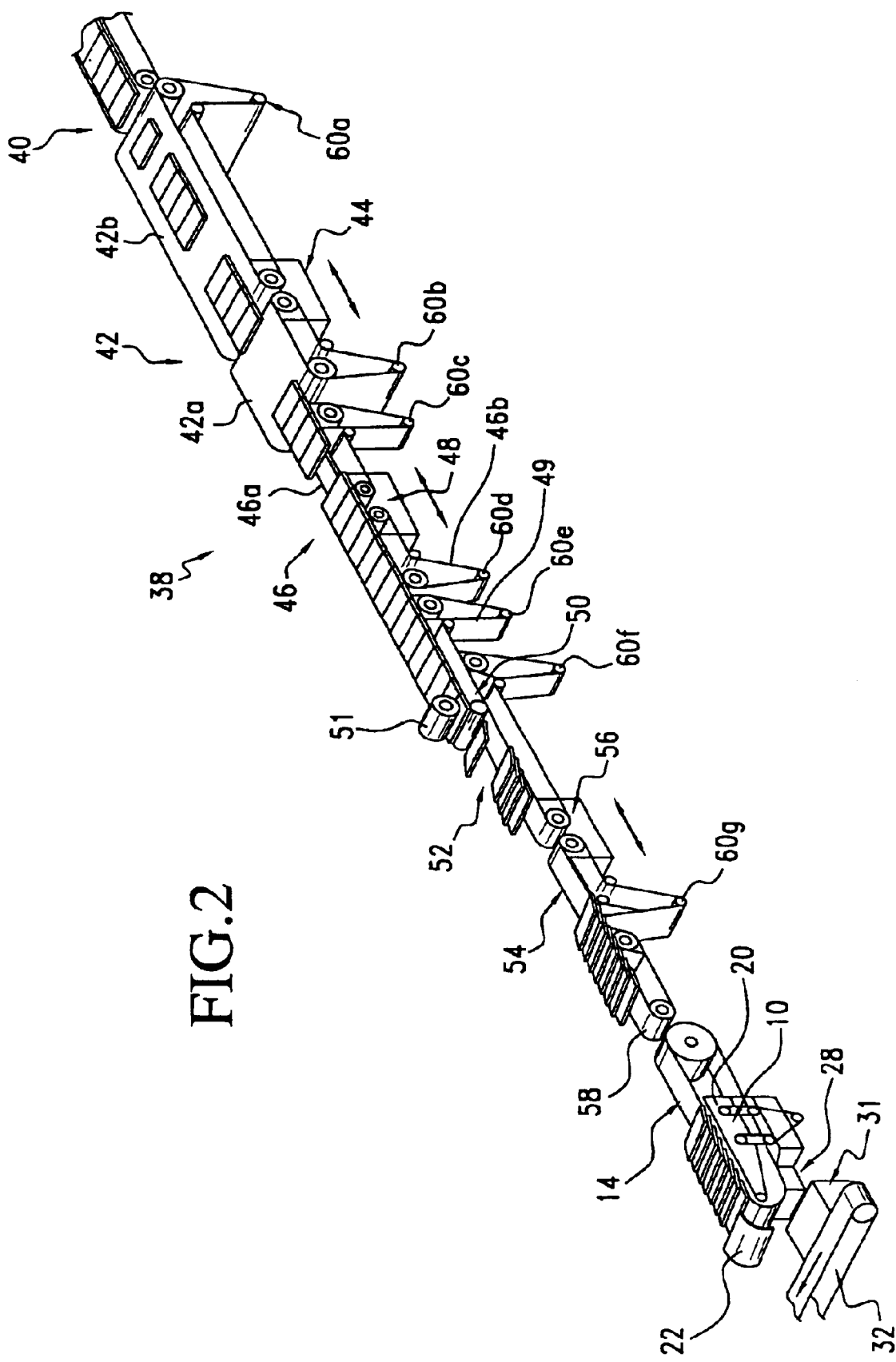
FIG. 2 shows a schematic perspective view of a stacking apparatus and infeed conveyor system including an infeed tilt conveyor.

FIG. 1a schematically illustrates the stacking apparatus of the present invention for stacking groups of shingled items such as graham crackers into vertical stacks of predetermined number of items in each stack. The stacking apparatus 10 receives groups of shingled items 12 that are placed on a stacking conveyor belt 14, i.e on its item input end 16, and transported to its item delivery end or output end 18. The stacking conveyor belt 14 is usually combined with an infeed system shown in. FIG. 2, which is located upstream of the input end 16 of the upper conveyor 14. The infeed system groups items in groups of desired number, places them in a shingled arrangement, separates the groups and delivers the groups in regular intervals to the input end 16.

A set of lowering arms 20 is located adjacent to the stacking conveyor belt 14, with at least one arm located adjacent to each side of conveyor belt 14. As a group of shingled items approaches the item delivery end 18 of the conveyor belt 14, the lowering arms are aligned in their upper position to be slightly below the upper surface of the stacking conveyor belt 14 and extend beyond the item delivery end 18 of the stacking conveyor belt 14. As the first or leading item 13 of the group 12 comes into contact with lowering arms 20, the forward movement of the first items is slowed down and then is completely stopped by the lowering arms 20 and the guide 22.

Figure 1B:
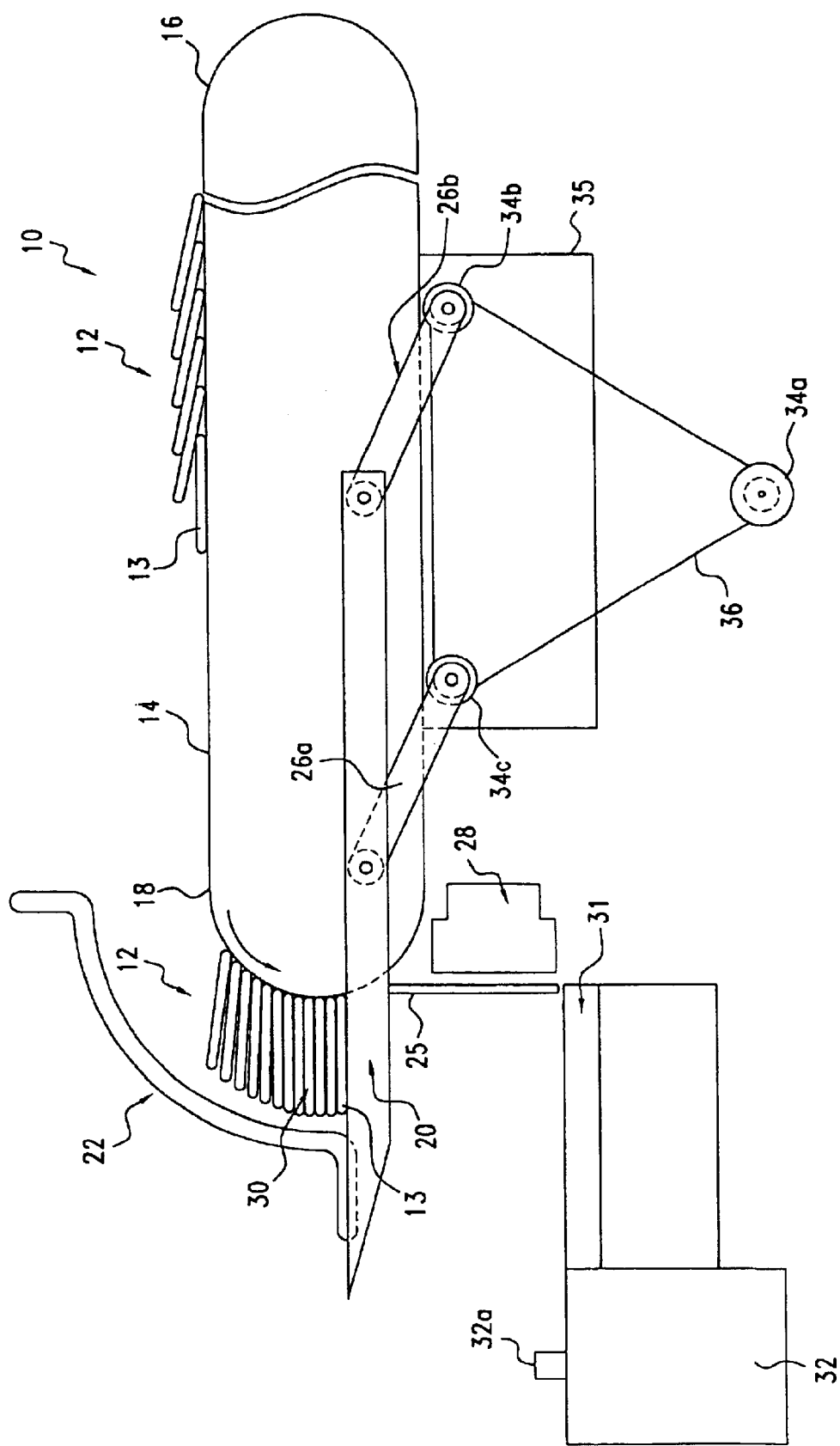
FIG. 1b shows the lowering arms of FIG. 1a lowering a vertical stack of graham crackers, wherein crackers are arranged in a horizontal position.

The guide 22 helps to prevent forward movement of every item in a group and helps to guide them into forming a vertical stack. After the first item 13 of the group 12 is placed on or transferred to the lowering arms 20, the lowering arms, attached to cranks 26a and 26b, are moved or swung down as shown in FIG. 1b by cranks 26a and 26b in a continuous motion lowering the first item 13 to a lower stacking platform 31. While the first item is being lowered, the items following the first item are continuously placed on top of each other, i.e. each item is placed on top of a previous item forming a vertical stack 30. During the lowering operation, cranks 26a and 26b travel continuously in a counter-clockwise circular motion. A stop plate 25 prevents any backward movement of the stack 30 as the lowering arms travel downwardly and backwardly, thereby forming a substantially vertically aligned stack of items.

Figure 1C:
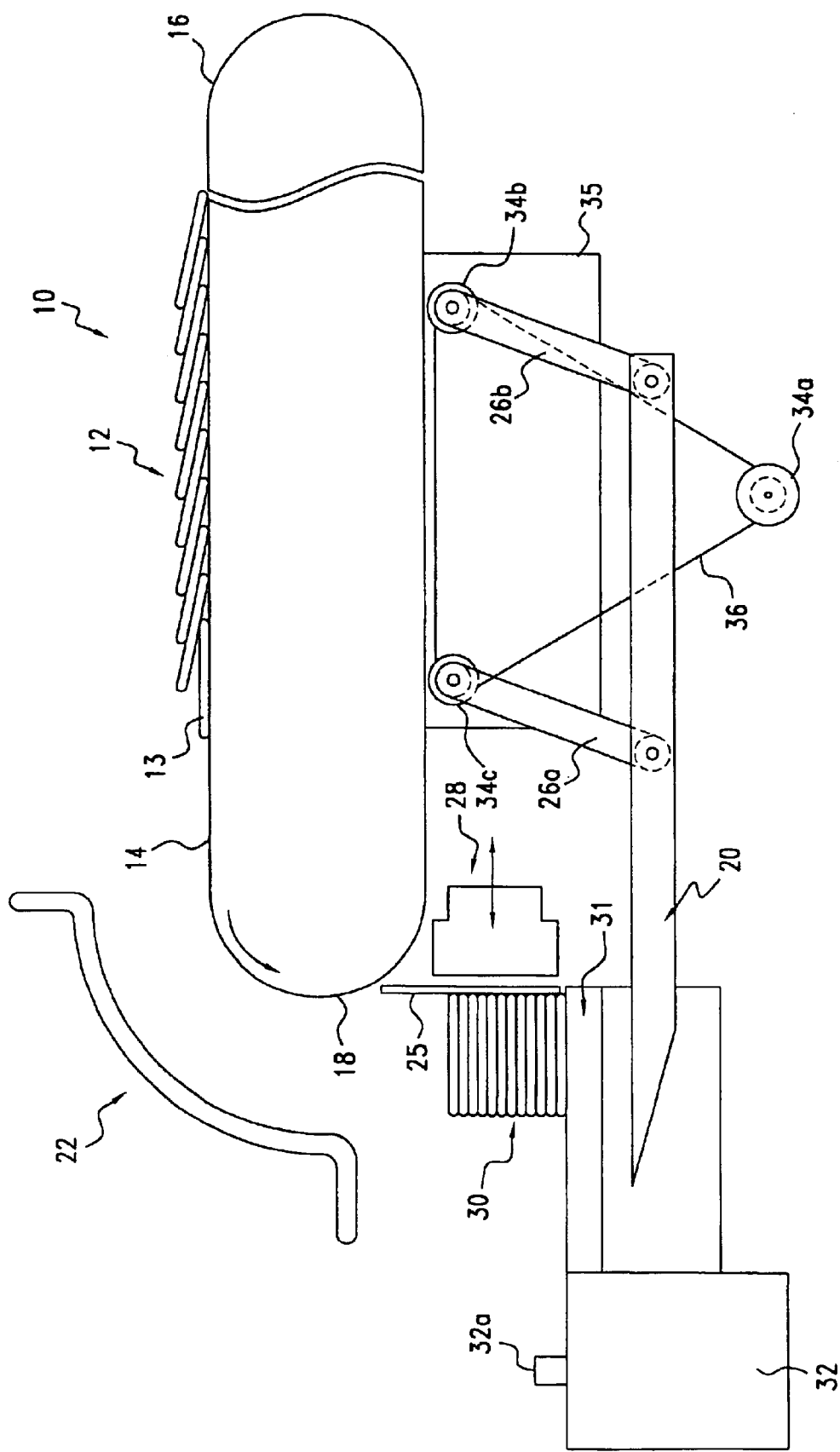
FIG. 1c shows the lowering arms of FIG. 1a in the retracting position after releasing a vertical stack of crackers placed on a lower stacking level.

After reaching the lower stacking level and placing a stack 30 on a lower stacking platform 31 lowering arms are retrieved or retracted as shown in FIG. 1c by cranks 26a and 26b downwards and backwards releasing the stack 30. The pushing plate 28 pushes the formed stack 30 horizontally, away from the stacking conveyor 14 and places it onto another conveyor 32, which may have compartments or flap fingers 32a. As soon as stack 30 is supported by stacking platform 31, the lowering arms continue to retract backward and downward, and then upward in order to reach the original upper position to receive the next incoming group of shingled items for stacking this next group into a vertical stack. Thus, after a complete release of the stack 30, the lowering arms may continue to move downward and backward, then backward and upward, and then upward and forward to its uppermost position so that the cranks 26a and 26b complete a full circle. Accordingly, for the lowering arms 20 to receive a new group of shingled items 12, thus completing the stacking cycle, the cranks 26a and 26b pivot about an axis at their pulleyed ends to complete a 360° path or full circle.

In another embodiment, the lowering arms 20 may be held in a downward position after releasing the vertical stack 30 for a time sufficient to remove the stack 30, and then swung back to their original uppermost position by cranks 26a and 26b moving in the opposite direction, i.e. in a clockwise direction, and reciprocating their original semi-circular path.

The lowering arms may be driven by a separate motor (not shown) not connected to the other driving means of the infeed system. The shaft of the motor may be drivingly connected to a pulley 34a that drives a belt 36 which is drivingly connected to pulleys 34b and 34c. The pulleys 34b and 34c may be rotatably mounted on a support 35, and drivingly connected to an end of rotatable cranks 26b and 26a, respectively. The belt 36 rotates pulleys 34c and 34b which rotate cranks 26a and 26b, respectively which causes the lowering arms 20 pivotally attached to the cranks 26a and 26b to move in counterclockwise direction. In embodiments of the invention, the pulleys 34a, 34b, and 34c, may be replaced by gears, and the belt 36 may be replaced by a chain drive.

The infeed system 38 shown on FIG. 2 comprises a series of conveyors moving in the same direction. The conveyors are moved by variable speed electric motors. The infeed conveyor 40 receives items, in a flat or slightly angled arrangement, depending on the profile of the belt of conveyor 40, as they arrive from another location. Conveyor 40 is designed to accept items delivered in batches, strips or rows at a right angle and transport them to the conveyor 42, moving at a variable speed to reduce gaps between the strips of items. Conveyor 42 quickly accepts batches of items delivered by conveyor 40 so that conveyor 40 is cleared to receive the next batch of items. Conveyor 42 comprises two conveyor belts 42a and 42b and a gap closing shuttle 44, for reducing gaps between the items that exist in the item stream due to missing or misplaced items. After the gaps are reduced the stream of items is transported to the next conveyor belt 46, moving at variable speed. Conveyor 46 completely closes gaps between the strips of items. Conveyor 46 also comprises two belts 46a and 46b and another gap reducing shuttle 48. The shuttle 48 completely eliminates any remaining gaps due to missing items, and the items are delivered to the end of the conveyor belt 46 as a continuous stream. In some cases it is possible to close all gaps with only one gap closing conveyor.

A solid stream of items then flows to the next conveyor 49 comprising a retracting noser 50 at the delivery end of the conveyor belt 49, to allow the stream of items to be separated into groups. An optional launch roller 51 located at the end of conveyor 49 prevents tilting of the flat items and assures that the items exit conveyor 49 in substantially horizontal position and form shingled groups upon entering conveyor 52 without turning on their other side. The flat items are counted by an overhead sensor or counter (not shown) and enter the next conveyor belt 52 in counted groups. Conveyor belt 52 moves with a speed slower than the speed of the conveyor belt 49, so that the items enter conveyor belt 52 slightly overlapped with each other and form groups of shingled items. When the desired count or number of items has been detected, the noser 50 extends momentarily preventing additional items from entering conveyor 52. At the same time, conveyor 52 increases its speed for a moment to move the formed group of shingled items forward thus forming a gap between the group of shingled items and the next incoming group. The groups of shingled items are then transported to yet another conveyor belt 54. By extending separating shuttle 56, the speed of conveyor belt 54 may be momentarily increased while a complete group of shingled items is supported by conveyor belt 54. The momentary increase in speed creates a greater separation of the groups.

Groups of products separated by the gaps of predetermined length between the groups enter the stacker feed conveyor 58 which delivers separated groups of shingled items to the input end of the stacking conveyor 14. The gaps between the shingled groups entering the stacking conveyor 14 has to be of sufficient length to allow the lowering arms 20 of the stacker 10 to complete one full stacking cycle with one group of items before the next group arrives at the delivery end of the stacking conveyor 14. The conveyors comprising shuttles and the nosers operate with the aid of automatic take-ups 60(a–g) known in the art and conventionally used with conveyors comprising shuttles or nosers.

The gaps between the groups and the speed of the stacking conveyor 14 has to be synchronized with the lowering arm cycle time, so that each group of items arrives at the delivery end of the stacking conveyor 14 at or after the exact moment when the lowering arms 20 are located in the upper position ready to receive the bottom item of the arriving group. Meanwhile, the speed of the lowering arms 20 is adjusted to keep pace with the flow of the groups of shingled items entering the system.

The infeed system 38 for the stacking apparatus 10 is comprised of several conveyors arranged in a series in such a manner that the groups of items are shingled and delivered to the stacking apparatus 10 at predetermined time intervals. If the items fed to the infeed system 38 arrive at the infeed system 38 moving in the same direction as the infeed system conveyor flow, conveyor 42 may be the first conveyor of the infeed system 38 and conveyor 40 may not be needed for the infeed system. If the items arrive in a direction perpendicular to the flow of the conveyors in the infeed system 38, i.e. at a right angle to the infeed system flow direction, the first conveyor of the infeed system is conveyor 40, specifically adopted to accept groups of batches of items arriving at a right angle to the flow of the infeed system 38.

Figure 3:
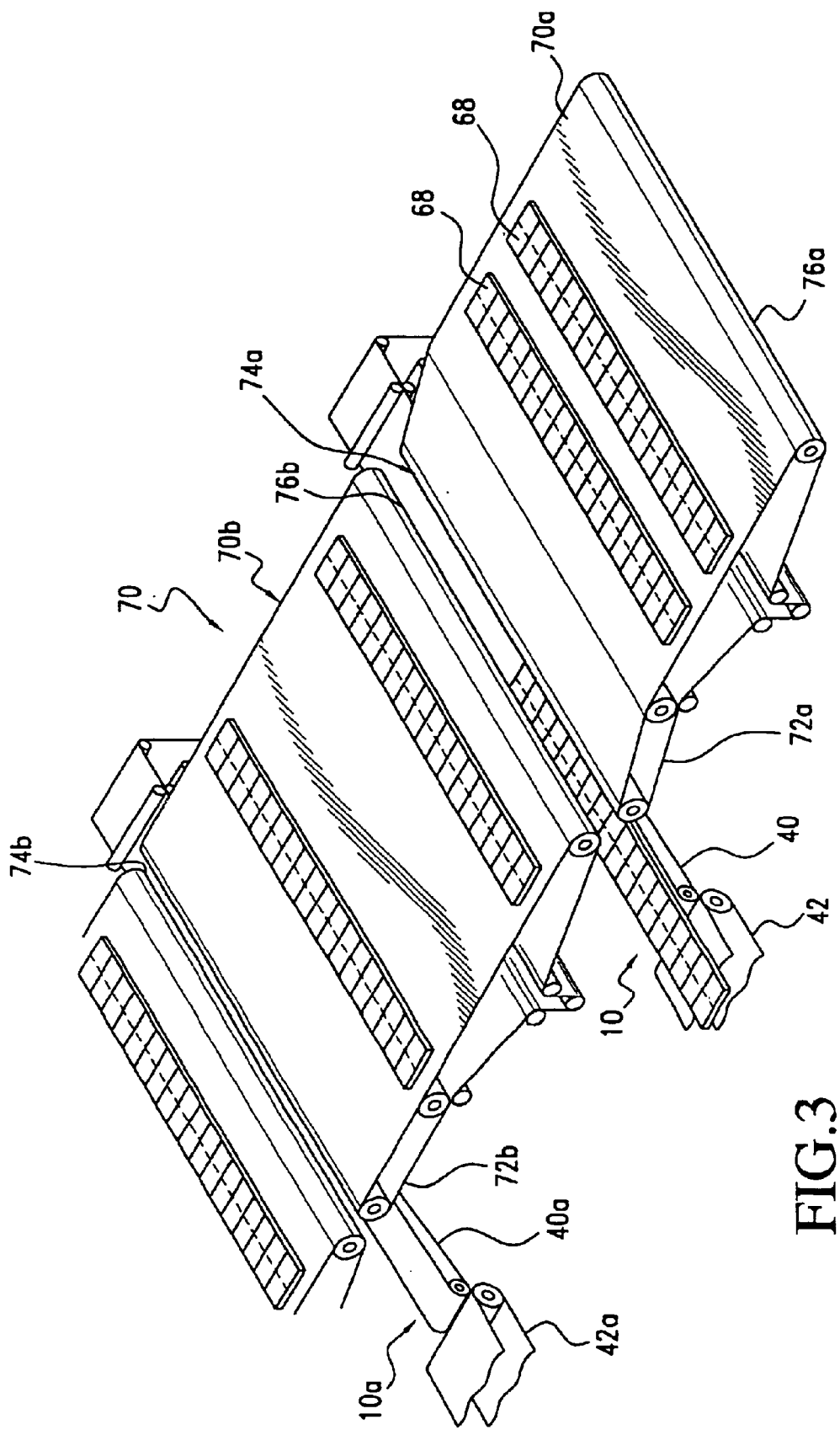
FIG. 3 shows a strip conveyor positioned at a right angle to the infeed system and tilt conveyor of FIG. 2 for right angle strip transfer.

As illustrated in FIG. 3 strips or batches of items 68 are delivered from another location, such as an oven, by the strip conveyor 70 transporting strips of products 68 at a right angle to the infeed system flow. The strip conveyor 70 is positioned perpendicularly to the conveyor 40 accepting batches or strips of items 68 from strip conveyor 70. Strip conveyor 70 usually delivers strips of items to several infeed systems 10, 10a and several others (not shown) arranged substantially parallel to each other. Conveyor 70 comprises a series of conveyor belts 70a, 70b (and others not shown) each of which comprises a drop gate 72a, 72b and several others (not shown) located near the front edges 74a, 74b etc. of the conveyors 70a, 70b, etc. and away from the back edges 76a, 76b, etc., of conveyors 70a, 70b, etc. The number of drop gates correspond to the number of parallel infeed systems.

When conveyor 40 is ready to accept a batch or a strip of items, the drop gate 72a tilts downward towards the conveyor 40, creating a gap in the series of conveyors 70 between conveyor 72a and 72b. The drop gate 72a tilts at an angle so that the forward edge 74a of the tilted conveyor 72a is located slightly above the belt of conveyor 40. At the same time, back edge 76b of the conveyor 70b may tilt upward to widen the gap between conveyors 70a and 70b for easier access of the strip of items 68 to conveyor 40. The strip of items 68 moves via tilted drop gate 72a toward conveyor 40 and through the gap and is discharged onto conveyor 40 upon reaching the belt of conveyor 40. As soon as the strip of items is discharged from conveyor 70 onto conveyor 40, the drop gate 72a moves upward bringing the drop gate in a substantially horizontal position and closing the gap in the conveyor 70. The next strip of items 68a continues to move onto conveyor 70 to one of the following infeed systems. Meanwhile, the strip of items discharged onto conveyor 40 moves onto the next conveyor 42 of the infeed system clearing conveyor 40. As soon as conveyor 40 is cleared of the strip of items, conveyor 40 is ready to accept the next strip of items delivered at a right angle by conveyor 70. At this point, the drop gate 72a will drop downward and the next strip of items will be discharged onto conveyor 40.

Figure 4:
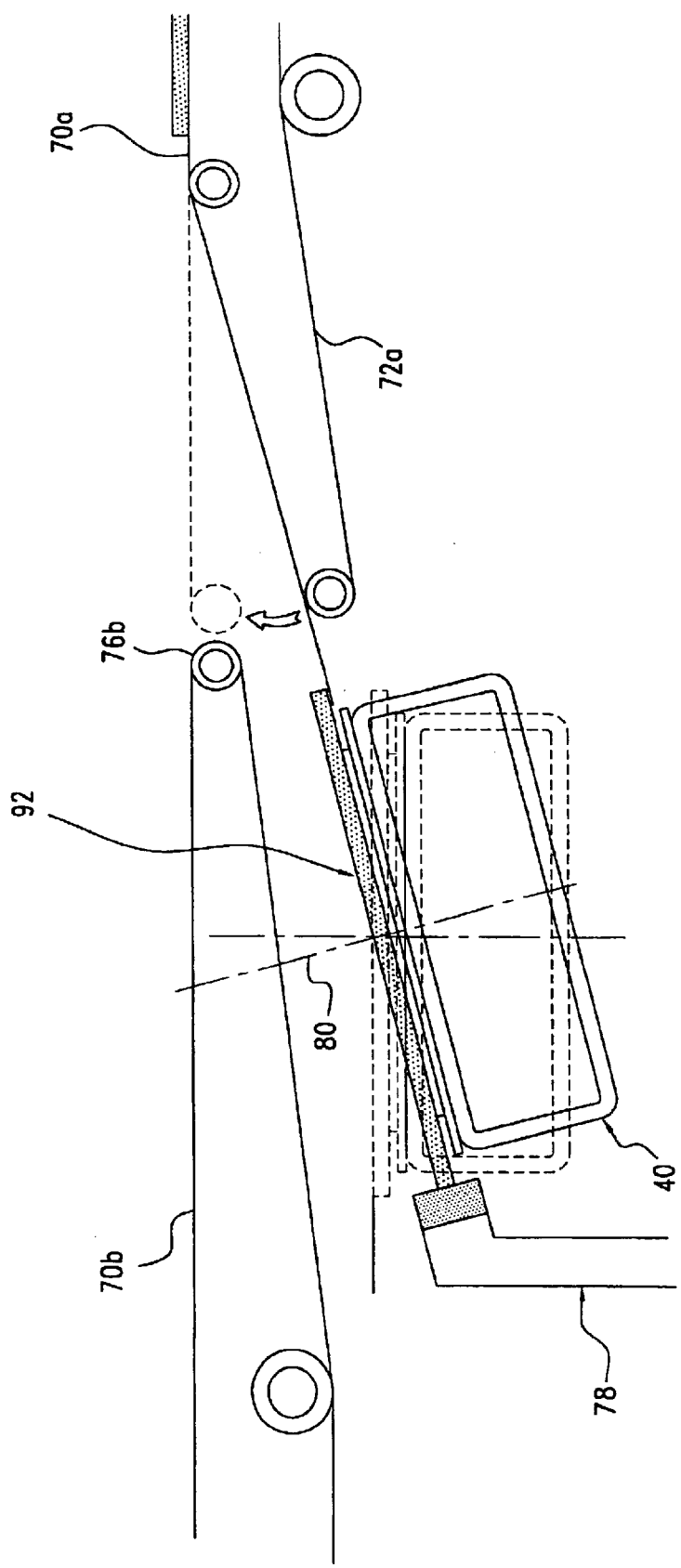
FIG. 4 shows a cross-sectional view of the tilt conveyor of FIG. 3 accepting items delivered by the strip conveyor.

When items delivered to conveyor 40 are breakable items, conveyor 40, the first conveyor in the series of conveyors in the infeed system is a tilt conveyor as shown in FIG. 4. When tilt conveyor 40 accepts strips of items from conveyor 70, the tilt conveyor 40 tilts from its original substantially horizontal position (shown by broken lines) at an angle corresponding to the angle of the tilted drop gate 72a so that the tilted drop gate 72a and tilted conveyor 40 are substantially parallel to each other and tilt conveyor 40 is positioned as an extension of the tilted drop gate or is in the substantially same plane as the tilted drop gate. The strip of items 68 is gently discharged from the tilted drop gate 72a onto tilted conveyor 40 by sliding onto conveyor 40.

A backstop 78 is located adjacent to the tilt conveyor 40 to prevent sliding items 68 from sliding past the conveyor 40. The backstop 78 may be cushioned at its end for cushioning of the sliding items. When the items reach the backstop 78, the center of gravity of each of the items in the strip of items 68 is positioned substantially directly above the central line 80 of the conveyor belt 40. The axis of rotation of tilt conveyor 40 is approximately at the center of gravity of the strip of items 68. Such positioning of the items prevents items from sliding or tilting during rotation of the conveyor 40 to the horizontal position. As soon as the items are discharged from the tilted end of conveyor 70 onto conveyor 40, the tilt conveyor 40 rotates back to assume its original substantially horizontal position and rapidly accelerates forward to deliver the strip of items 68 loaded onto conveyor 40 to the next conveyor 42 in the series of conveyors in the infeed system 10.

Figure 5:
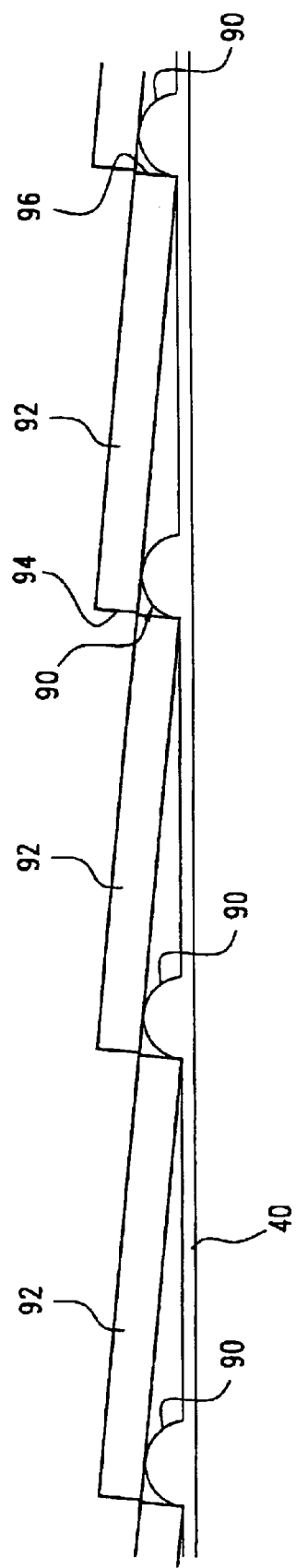
FIG. 5 shows a profile of the tilt conveyor of FIG. 3.

The profile of the tilt conveyor 40 may be flat or may contain bumps or teeth 90 as shown in FIG. 5. Teeth 90 are spaced from each other so that the distance between the center or top of each tooth and the next tooth is substantially the same as the width of an individual item 92 in a strip of items 68. Upon discharging the strip of items 68 onto conveyor 40, each of the individual items occupies space between the teeth 90, with the front or leading edge 94 of each of the items 92 leaning on one of the teeth 90 and the back edge 96 of each item 92 resting against or abutting or near the bottom of the next tooth 90. Such arrangement of the items on conveyor 40 prevents items, especially the last few items in a strip 68, from sliding backwards upon rapid acceleration of conveyor 40. Also, since the distance between the centers of the teeth is substantially equal to the width of individual items, the items are discharged onto the next conveyor 42 in substantially flat arrangement without overlapping.

The stacking apparatus may be used to stack a wide variety of items delivered to the stacker conveyor in shingled arrangement and also may be used to stack or transport individual items from an upper conveyor to a lower level. The method utilizing the stacking-apparatus allows for a very gentle handling of the items by slowing down the forward movement of the items and completely stopping the forward movement of the items without heavy impact of the items against stopping gates or other stopping devices and without any impact of dropping of the items. Jamming of the system is extremely unlikely because the need for any metering gates normally used in known stacking systems is eliminated. Usually, vertical stacks of a predetermined number of items are formed from large vertical stacks by metering or counting a desired number of items from the bottom of the vertical stack and pushing a smaller vertical stack containing a counted number of items through a metering gate. The height of the metering gate is preset so that the upper bar of the gate is slightly higher than the height of the smaller vertical stack containing a predetermined number of items. As a result, the smaller vertical stack can pass through the gate. However, stacks having a height of the smaller vertical stack plus one additional item, would have the additional item stopped by the gate and only the desired number of items would pass through the gates. For example, if the desired small stack should contain 12 items, the height at which the upper bar of the metering gate is located would be above the height of 12 items, but below the height of 13 items, so that the 13th item is stopped by the upper bar. However, the heights of individual items in the stack may vary, such as, for example, in the case where the stacked items are food items such as crackers. The height of the smaller stack with a predetermined number of items may be higher than the anticipated or desired height. In this case, the metering gates would cause breakage or scraping of the top item which leads to a severe problem of stacking apparatus jamming. The need for metering of a desired number of items from a large vertical stack and using any kind of metering gates is completely eliminated when using the stacking apparatus of the present invention. Accordingly, reducing or even elimination of jamming is achieved with the stacking apparatus of the present invention, which leads to a more economical process and easy maintenance of the stacking apparatus.

What is claimed is:

1. An infeed system for a stacking apparatus comprising a series of at least four conveyors wherein:
   at least one of said four conveyors comprises a gap-closing shuttle for reducing gaps between items in a stream of items,
   at least one of said four conveyors comprises a gap-reducing shuttle for eliminating any remaining gaps between the items,
   at least one of said four conveyors comprises a retracting noser for separating the items into groups of items, and
   at least one of said four conveyors comprises a group-separating shuttle for creating a greater separation of predetermined length between the groups of items.

2. An infeed system as claimed in claim 1, further comprising a receiving conveyor for receiving items delivered at substantially a right angle to the flow of the series of at least four conveyors in said infeed system.

3. An infeed system as claimed in claim 2, wherein said receiving conveyor is a tilt conveyor.

4. An infeed system as claimed in claim 3, further comprising a backstop, wherein said backstop is located adjacent to said tilt conveyor.

5. An infeed system as claimed in claim 3, wherein said tilt conveyor comprises a conveyor belt.

6. An infeed system as claimed in claim 5, wherein said conveyor belt is a profile belt.

7. An infeed system as claimed in claim 3, wherein said tilt conveyor further comprises a backstop attached to said tilt conveyor.

8. An infeed system as claimed in claim 3, further comprising an overhead transfer conveyor positioned above and substantially at a right angle to said tilt conveyor, wherein said tilt conveyor is pivotally mounted for tilting and alignment with the surface of a drop gate of said overhead transfer conveyor, and for pivotably returning to a horizontal position after receiving the items from said overhead transfer conveyor.

9. An infeed system as claimed in claim 8, wherein at least one end of a conveyor in the series of conveyors is aligned with said tilt conveyor in its horizontal position.

10. An infeed system as claimed in claim 4, wherein the backstop is located below a horizontal position of said tilt conveyor so that it becomes at least substantially aligned with an edge of said tilt conveyor.

11. An infeed system as claimed in claim 8, wherein said overhead transfer conveyor comprises a series of conveyor belts, each of which comprises a drop gate.

12. An infeed system as claimed in claim 11, wherein a drop gate tilts downwards to said tilt conveyor, thereby creating a gap in said series of conveyor belts.

13. An infeed system as claimed in claim 3, wherein said tilt conveyor comprises teeth that are spaced apart at a distance that is substantially the same as the width of an individual item in a strip of items.

14. An infeed system as claimed in claim 1, wherein said items comprise cookies, chips, or graham crackers.

15. An infeed system as claimed in claim 1, further comprising an overhead sensor for counting the items.

16. An infeed system as claimed in claim 1, further comprising a launch roller at the end of a conveyor comprising the retracting noser.

17. An infeed system as claimed in claim 1, wherein a conveyor comprising the group-separating shuttle moves at a slower speed than a conveyor comprising the retracting noser, thereby forming groups of shingled items.

* * * * *